United States Patent [19]
VanFleet

[11] Patent Number: 5,440,637
[45] Date of Patent: Aug. 8, 1995

[54] LISTENING AND DISPLAY UNIT

[76] Inventor: Earl E. VanFleet, P.O. Box 915, Camden, Me. 04843

[21] Appl. No.: 5,225

[22] Filed: Jan. 15, 1993

Related U.S. Application Data

[63] Continuation-in-part of Ser. No. 618,705, Nov. 27, 1990, abandoned.

[51] Int. Cl.⁶ .............................................. H04R 5/00
[52] U.S. Cl. ...................................... 381/1; 381/124; 360/12; 360/92; 369/20; 369/30; 369/69; 369/75.1; 369/274
[58] Field of Search ................... 381/1, 28, 87, 124; 360/12, 91, 92; 369/20, 30, 34, 272, 274, 69, 75.1

[56] References Cited

U.S. PATENT DOCUMENTS

| | | | |
|---|---|---|---|
| 2,375,043 | 5/1945 | Shaffer | 35/50 |
| 2,911,462 | 11/1959 | Brady | 178/5.6 |
| 3,209,074 | 9/1965 | French | 179/1 |
| 3,378,639 | 6/1968 | Dufendach et al. | 179/1 |
| 3,623,242 | 10/1970 | Hoover | 35/35 |
| 3,983,550 | 9/1976 | Goss et al. | 340/221 |
| 4,445,147 | 4/1984 | Kessman et al. | 360/12 |
| 4,878,847 | 11/1989 | Rutledge | 439/74 |

OTHER PUBLICATIONS

Radio Shack ®, Wireless Remote Control Systems and Timers, 1986 Catalog, No. 393, p. 148.

Primary Examiner—Brent A. Swarthout
Assistant Examiner—Edward Lefkowitz
Attorney, Agent, or Firm—Fish & Richardson

[57] ABSTRACT

A listening and display unit for playing and promoting audio recordings, including a display surface for promotional and instructional messages, two or more audio jacks connected by an audio cable to one of several player units, a AC/DC power unit to power the player units, a DC power jack connected by a power cable to the power unit and connected by a wiring harness to the player units.

20 Claims, 8 Drawing Sheets

EIGHT CASSETTE WIRING HARNESS

LISTENING AND DISPLAY UNIT

BACKGROUND OF THE INVENTION

This application is a continuation-in-part of U.S. Ser. No. 07/618,705, filed Nov. 27, 1990, now abandoned.

The invention relates to display units used to demonstrate audio recordings.

Previously known listening units include instruction units having a teacher station and a number of tape decks connected to student stations, each having a microphone, a volume control, and headphones. In addition, one known listening and display unit includes visual displays and selection switches, wherein a tape player plays a different message for each of the visual displays when a user selects the selection switch corresponding to one of the displays. Another listening and display unit includes a display unit and a record player that continuously plays preselected portions of a record until a user selects a different portion of the record. When the user makes his selection, a microprocessor locates the selected portion and the record player plays the selection.

SUMMARY OF THE INVENTION

In general, the present invention features a listening and display unit for playing and promoting audio recordings including a display surface adapted for display thereon of a plurality of promotional and instructional messages, playing devices, each device playing a preselected audio recording, a player support unit disposed within the listening display unit to support the plurality of playing devices, the player support unit having a plurality of connectors, each connector corresponding to one of the playing devices, a plurality of audio jacks mounted on the display surface, each audio jack associated with one of the connectors and playing devices, audio cables for connecting each of the jacks to an associated one of the playing devices, and an AC/DC power unit adapted to power the plurality of playing devices.

In preferred embodiments, the invention may include one or more of the following features. The listening and display unit is constructed as a free standing tower or a wall mounted unit. Each of the playing devices is supported within an enclosure having a connector for coupling to an associated one of the plurality of connectors of the player support unit to provide power and audio signals to the playing devices. The player support unit includes a plurality of compartments for supporting each of the playing devices, a DC power jack connected to the AC/DC power unit via a power cable and a wiring harness for connecting the playing devices to the DC power jack. Alternatively, a connector plate having a DC power jack connected to the AC/DC power unit via a power cable may be used to connect the plurality of connectors of the player support unit via a signal cable. The connector plate is attached to an inner wall of the listening and display unit and has a plurality of audio jacks connected to the plurality of audio jacks mounted on the display unit. The connectors of each enclosure mate with an associated one of the plurality of connectors of the player support unit. The player support unit comprises a central support plate member for disposing a first plurality of the playing devices on a first surface and a second plurality on an opposing second surface and spring clamping means attached to the support plate member for securing each of the playing device enclosures within the player support unit. The central support plate member includes guide members, such as metal pins for facilitating installation and removal of the playing device enclosures within and from the player support unit. Each playing device enclosure includes a light indicator (e.g., a light-emitting diode) to indicate that connectors of each enclosure are mated with an associated one of the plurality of connectors of the player support unit. A plurality of audio jacks is associated with each of the playing devices. A timer mechanism is connected to the power unit to turn the unit on and off automatically; recessed areas are provided for storage of audio recordings; and the player units are portable auto-reverse cassette players, compact disc players, and mini disc players.

Other features and advantages will be apparent from the drawings and the following description of a presently preferred embodiment.

DESCRIPTION OF THE PREFERRED EMBODIMENT

Referring first briefly to the drawings.

Figure 1:
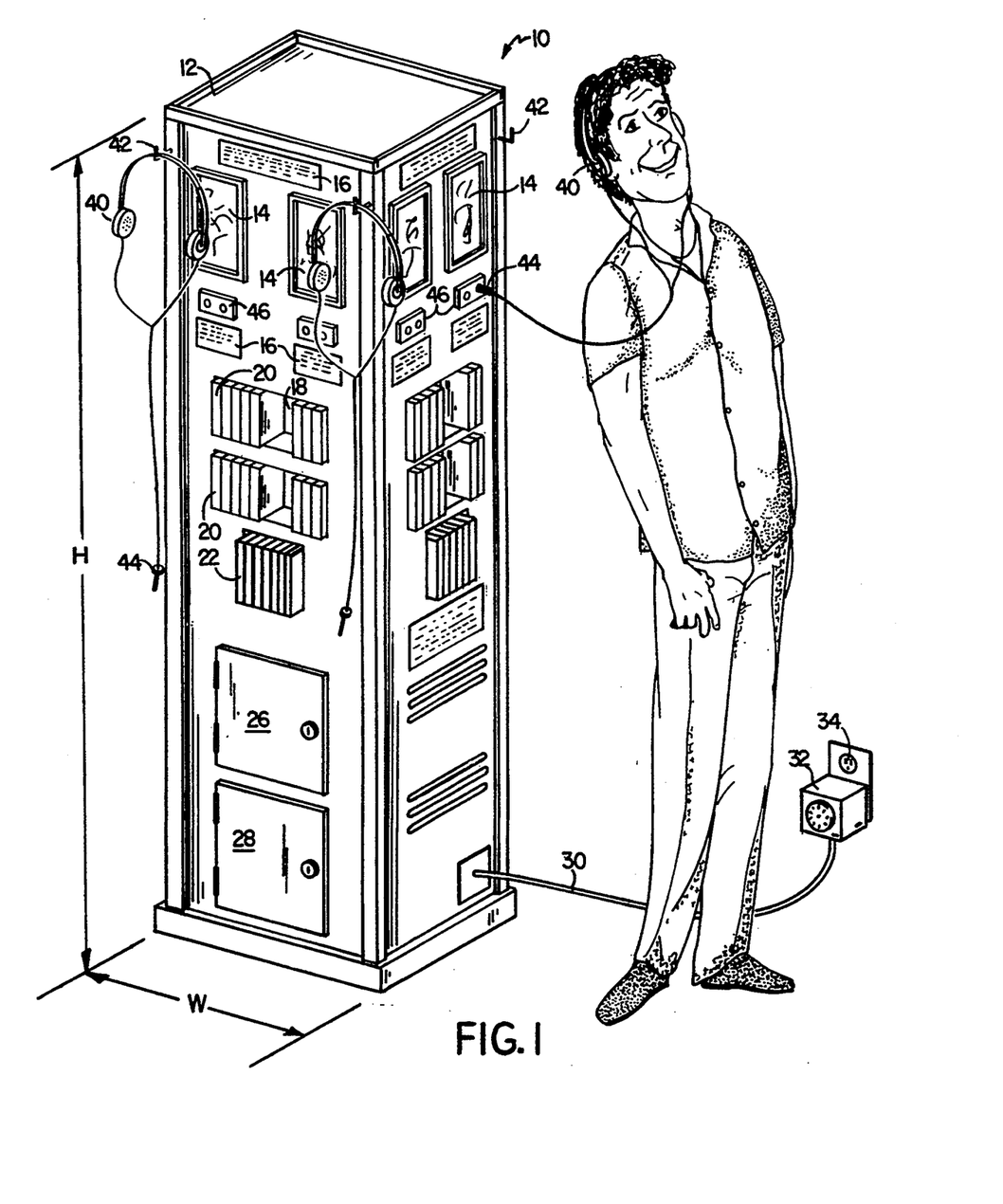
FIG. 1 is a perspective view of a listening and display unit according to the present invention in use.

Referring to FIG. 1, a listening and display unit 10 includes a free standing rectangular tower 12 on which are mounted promotional displays 14 for various audio recordings and instructional messages 16 to attract a potential listener and inform him of the use of the unit 10. In preferred embodiments the tower 12 has a height H, e.g., approximately 5 feet high, and a width and length, e.g., 14 inches square, to correspond to the average size of a listener. Also, the tower 12 is preferably constructed of wood, e.g., birch and mahogany to provide an attractive display. In alternative embodiments, a wall mounted unit may be substituted for the tower and the unit may be constructed of non-wood materials, provided they do not interfere with the transmission of power to the multiple cassette player unit (described below).

To further enhance the usefulness of the unit 10, recessed areas 18 are provided to hold copies of the promoted recordings in various media, e.g., cassette tape 20 and compact disc 22, which the listener can remove and purchase, e.g., in a commercial setting, or check out, e.g., in a library or school setting. The tower 12 further includes ventilation openings 24 to cool the multiple cassette player unit and an AC/DC power supply unit (described below) which are hidden behind an upper door 26 and lower door 28, respectively. Connected to the power supply unit is a AC electrical cord 30 which plugs into a wall timer 32 inserted in a standard AC electrical outlet 34. The wall timer 32 is set to turn the power unit on and off at specified times, e.g., at the opening and closing of a record store or library. Thus, the power supply for unit 10 is automatic and requires no user intervention.

Figure 2:
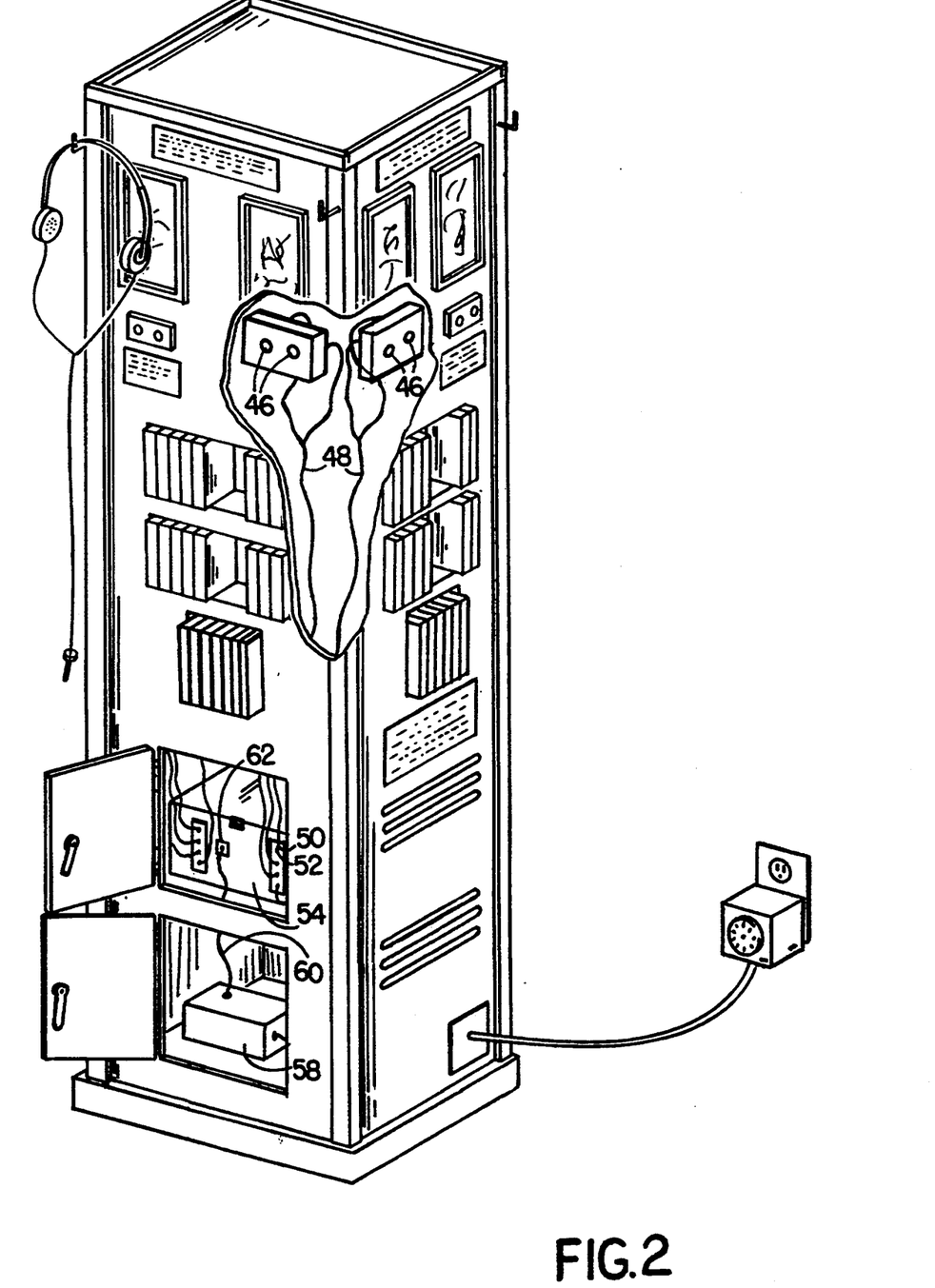
FIG. 2 is a perspective view of the listening and display unit of FIG. 1 partially cut away.
Figure 3:
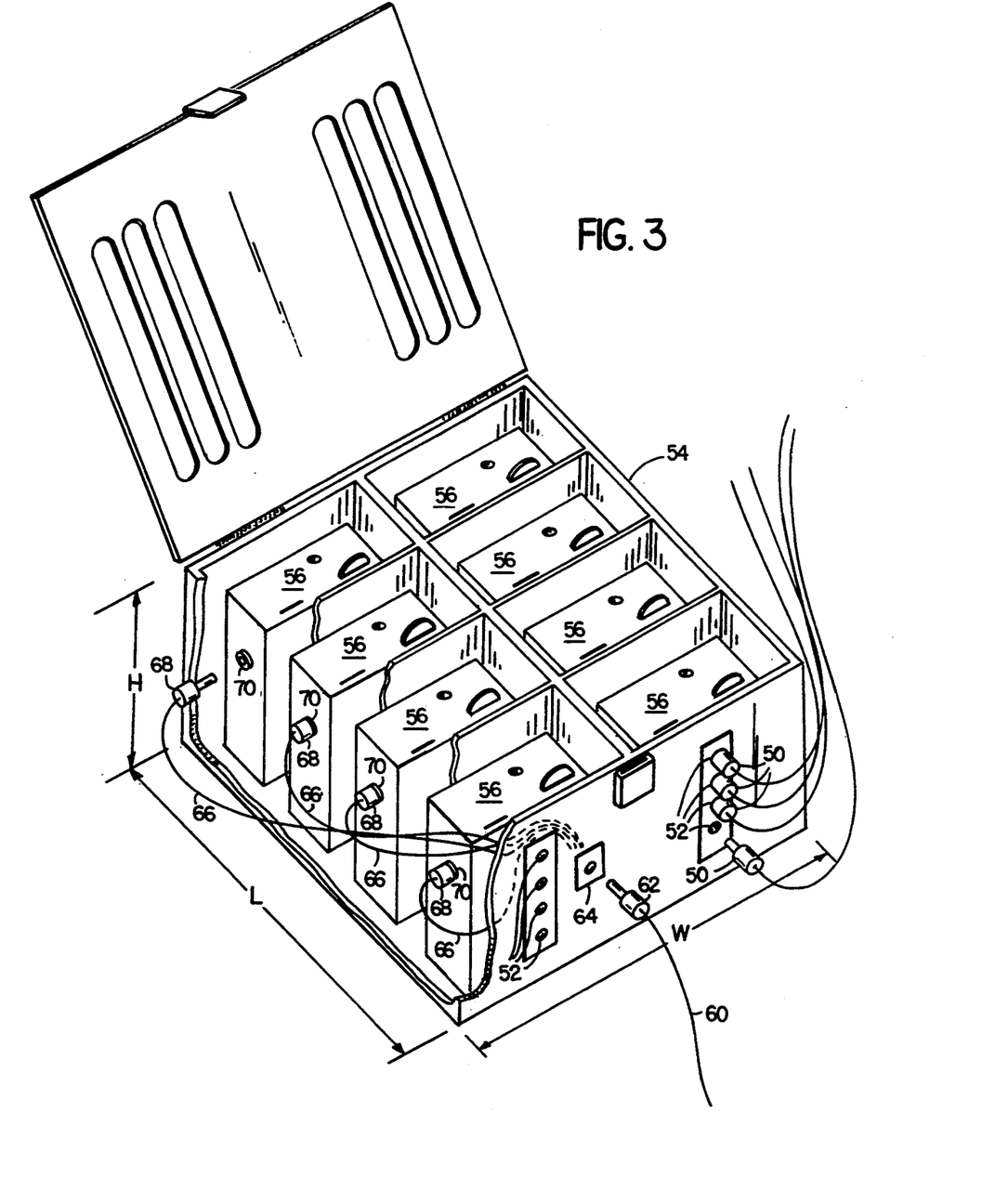
FIG. 3 is a perspective view of a multiple cassette unit contained within the listening and display unit of FIG. 2, including the wiring used to connect the cassette unit to the display unit.
Figure 7:
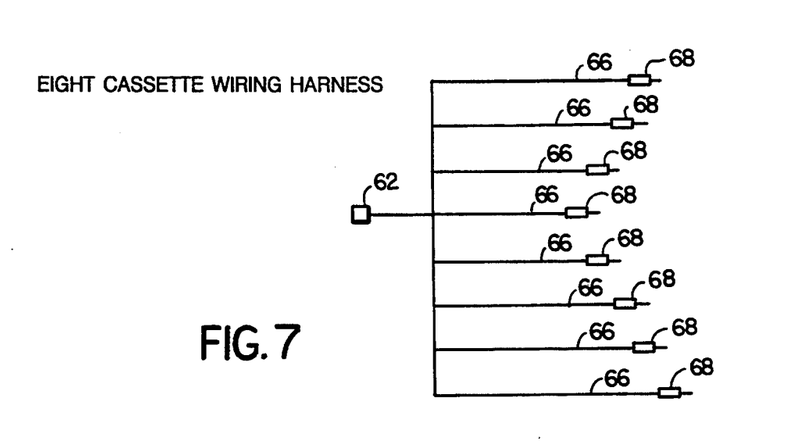
FIG. 7 is a diagram of the DC wiring harness used to connect the multiple cassette unit to the individual cassette players.

To listen to one of the recordings being promoted, a listener removes a pair of headphones 40 from a hook 42 on the tower 12 and inserts the headphone plug 44 into one of the headphone jacks 46 located beneath each of the promotional displays 14. Referring to FIGS. 2 and 3, the headphone jacks 46 are connected via dual headphone cables 48, e.g., conventional three wire cable, (also shown in FIG. 7) to headphone plugs 50. The plugs 50 are inserted into one of a series of headphone jacks 52 on the side of the multiple cassette player unit 54, having a height H, e.g., approximately 6.75 inches high, a length L, e.g., 9.25 inches long, and a width W, e.g., 10.5 inches wide. The player unit 54 is divided into compartments, each of which contains one portable cassette player 56. In an important aspect of the invention, the player unit 54 is removable from the tower 12 and is constructed so that the tapes may be changed over time, and to allow the player unit to be shipped to a repair center for maintenance, e.g., routine cleaning of capstan heads and pinch rollers, or replacement of defective individual players.

A cassette tape containing the audio recording corresponding to each display 14 is inserted into one of the cassette players 56 and the player is set to "play" so that it turns on and off automatically as the wall timer 32 activates the power unit 58. In the preferred embodiment, eight portable cassette players 56 are included in the multiple cassette unit 54 and each is connected to two headphone jacks. In addition, each cassette player 56 includes an "auto reverse" feature, e.g., as found in the commercial brands AIWA HSG 370, HSG 570, and HSG 210. Thus, when the power unit 58 is turned on, the cassette tapes play continuously without user intervention.

Figure 6:
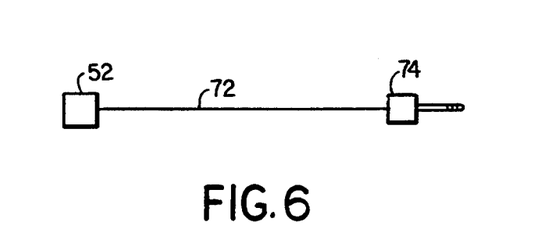
FIG. 6 is a diagram of the headphone extension cables used to connect the multiple cassette unit to the individual cassette players.
Figure 8:
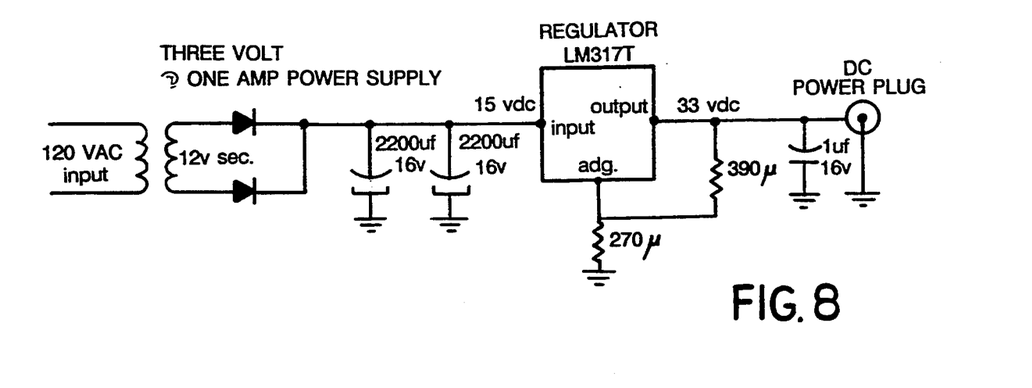
FIG. 8 is a schematic diagram of the power supply unit contained within the display unit of FIG. 2.

Referring to FIGS. 2 and 3, the cassette players 56 in the multiple cassette player unit 54 are powered by the power unit 58, a schematic diagram of which is provided in FIG. 8. Preferably, the player unit 54 and the power unit 58 are located approximately 12 inches away from one another to eliminate electrical interference from the power unit which causes a humming noise to emit from the player unit. A power cable 60 which runs directly from the power unit and terminates in a DC power plug 62 is inserted in a DC power jack 64 in the side of the player unit 54. The DC power jack 64 is one terminal of a DC wiring harness (also shown in FIG. 6), which includes eight cables 66, e.g., 2 wire, 24 gauge conductors, of varying length connected to eight DC power plugs 68, each of which is inserted into a DC power jack 70 in one of the cassette players 56. For the sake of simplicity, only four of the eight connections are shown.

Figure 4:
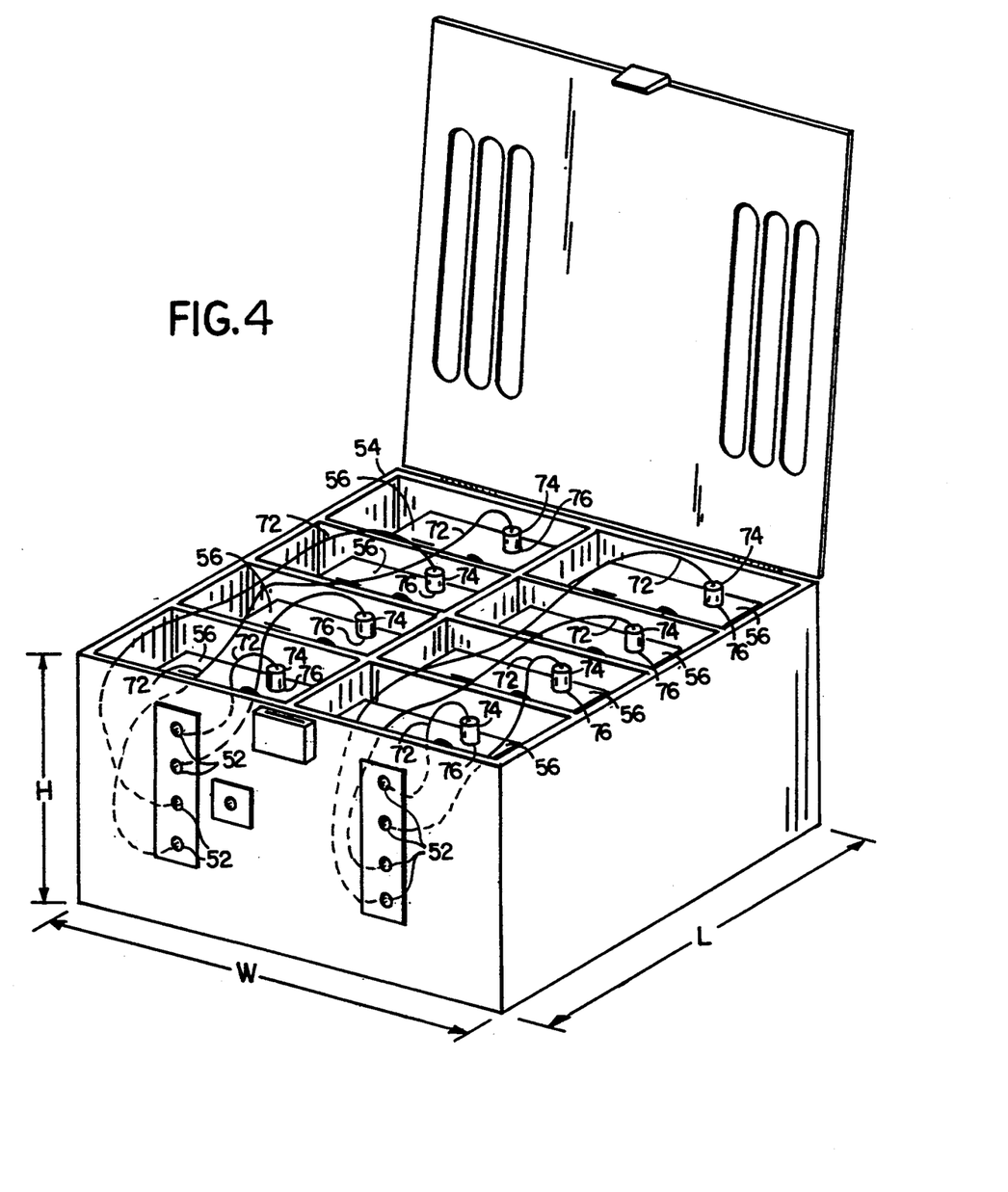
FIG. 4 is a perspective view of the multiple cassette unit of FIG. 3, including its internal wiring.
Figure 5:
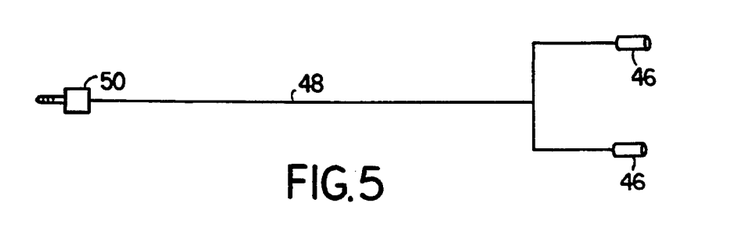
FIG. 5 is a diagram of the dual headphone cable used to connect the display unit to the multiple cassette unit.

Referring to FIG. 4, each jack 52 is connected to one of the cassette players 56 via an extension cable 72, e.g., three wire cable, (also shown in FIG. 5) which terminates in a plug 74 that is inserted into a headphone jack 76 in the cassette player 56. For the sake of simplicity, the power connections of FIG. 3 are omitted from FIG. 4.

Figure 9:
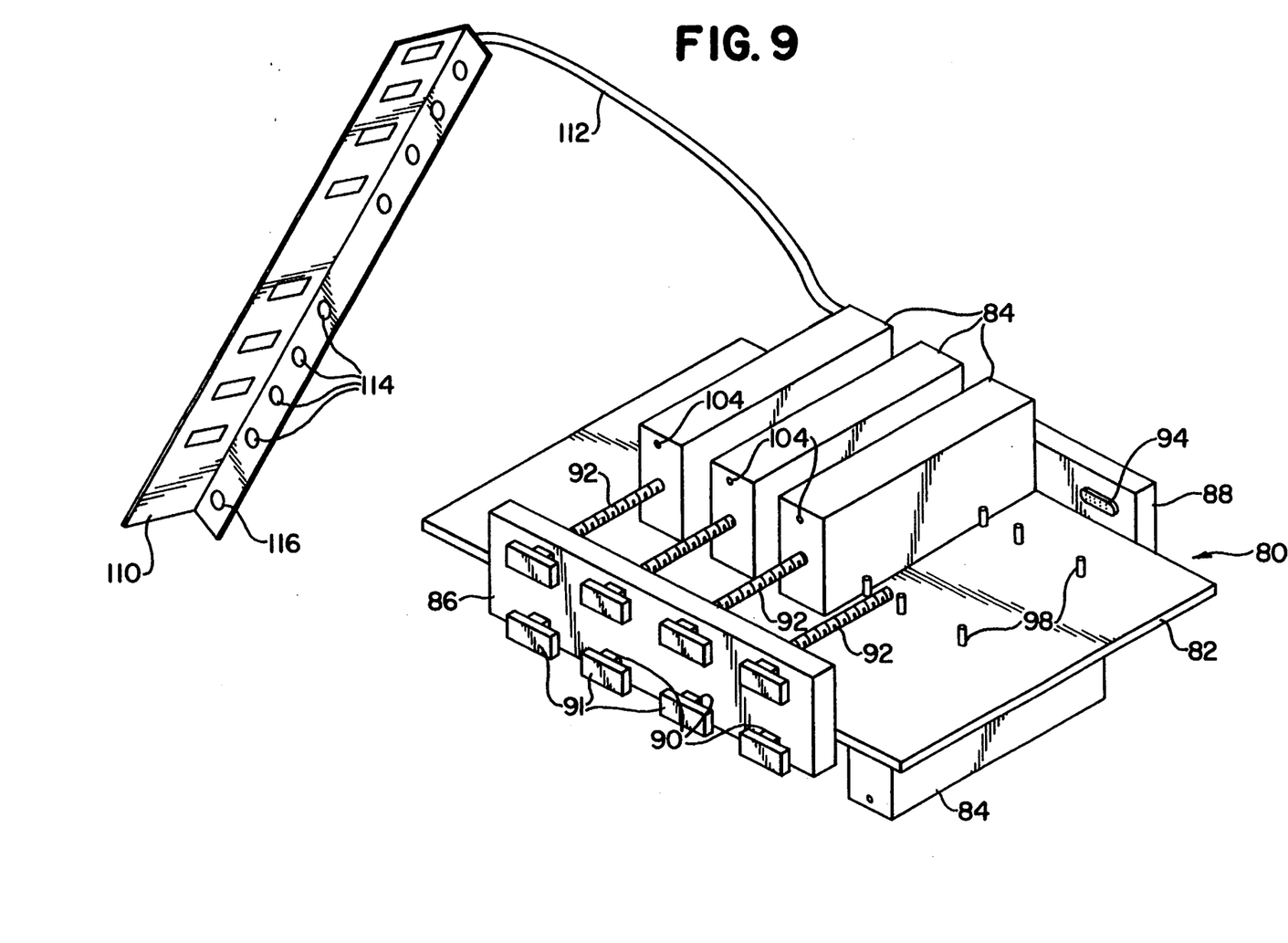
FIG. 9 is a perspective view of an alternate multiple cassette unit, including individual component boxes.

In a preferred embodiment, the multiple cassette player unit 54 described above in conjunction with FIGS. 1-8, is provided as a player support unit 80. Referring to FIG. 9, player support unit 80 includes an aluminum plate 82 having a spring support panel 86 attached to a front edge surface of plate 82 and a connector panel 88 attached to an opposite edge surface of the plate 82. Aluminum plate 82 supports eight separate component boxes 84, each component box holding an individual tape player (or compact disc player). Four component boxes can be supported on an upper surface and four on a lower surface of aluminum plate 82.

Spring support panel 86 includes two rows of equally spaced apertures, each aperture having a spring loaded rod 90 disposed therethrough. Each spring loaded rod 90 is attached to a handle 91 and firmly secures each component box 84 onto aluminum plate 82 with a relatively stiff spring 92 surrounding rod 90. Connector panel 88 includes corresponding rows of multi-pin connectors 94, each connector associated with a corresponding component box 84. Multi-pin connectors 94 provide signal paths for DC power signals needed to power each tape player unit 56 and for audio signals feeding headphone jacks 46 on the display unit 10.

Figure 10:
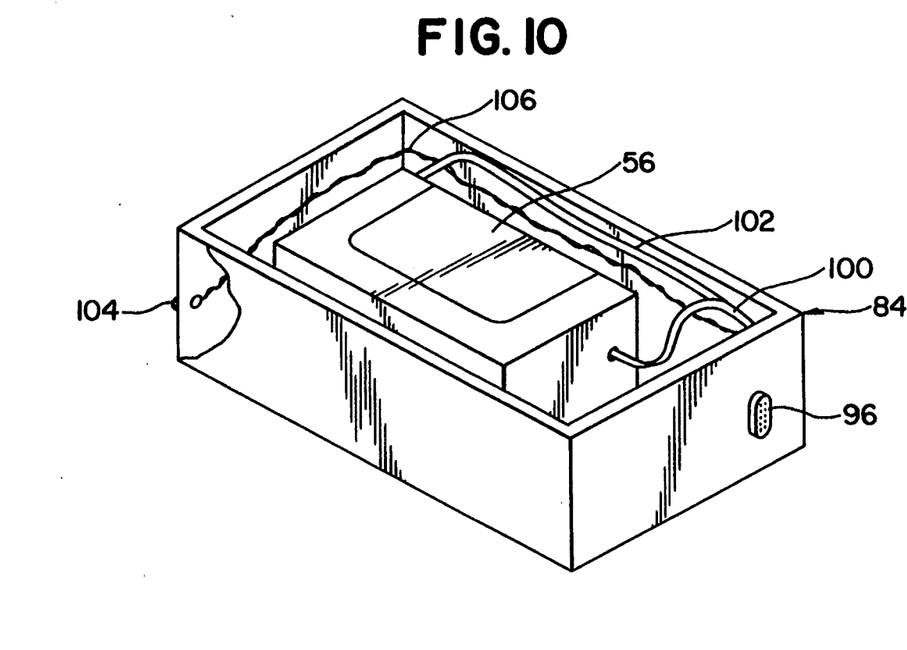
FIG. 10 is a partially broken-away perspective view of a component box used with the multiple cassette unit of FIG. 9.

Referring to FIG. 10, each component box 84 (cover removed) for supporting a cassette player 56 is fabricated from aluminum and includes a multi-pin connector 96 disposed on an outer wall of each box 84 to mate with connectors 94 of connector panel 88. Connector cables 100, 102 within component boxes 84 are connected to appropriate pins of connector 96 to provide audio signals and DC power respectively to each player 54. A lamp indicator 104 (e.g., a light-emitting diode) is disposed on an opposite outer wall of the component box 84 and is connected to connector 96 via wires 106 to indicate a proper electrical connection between component box 84 and the connector 82.

To mount a component box 84 within the player support unit 80, handle 92 of spring loaded rod 90 is pulled back to compress spring 92 to allow box 84 to be slid into place to make contact with connector 94 mounted on connector panel of the player support unit 80. When the electrical connection is made, LED light indicator 104 is illuminated on the end of box 84. Spring loaded rod 90 is then released to press against component box 84 with sufficient force to hold the box firmly in place. Metal pins 98 acting as guide members are disposed through aluminum plate 82 and spaced a distance commensurate with the width of each component box to facilitate the installation and removal of each box.

Figure 11:
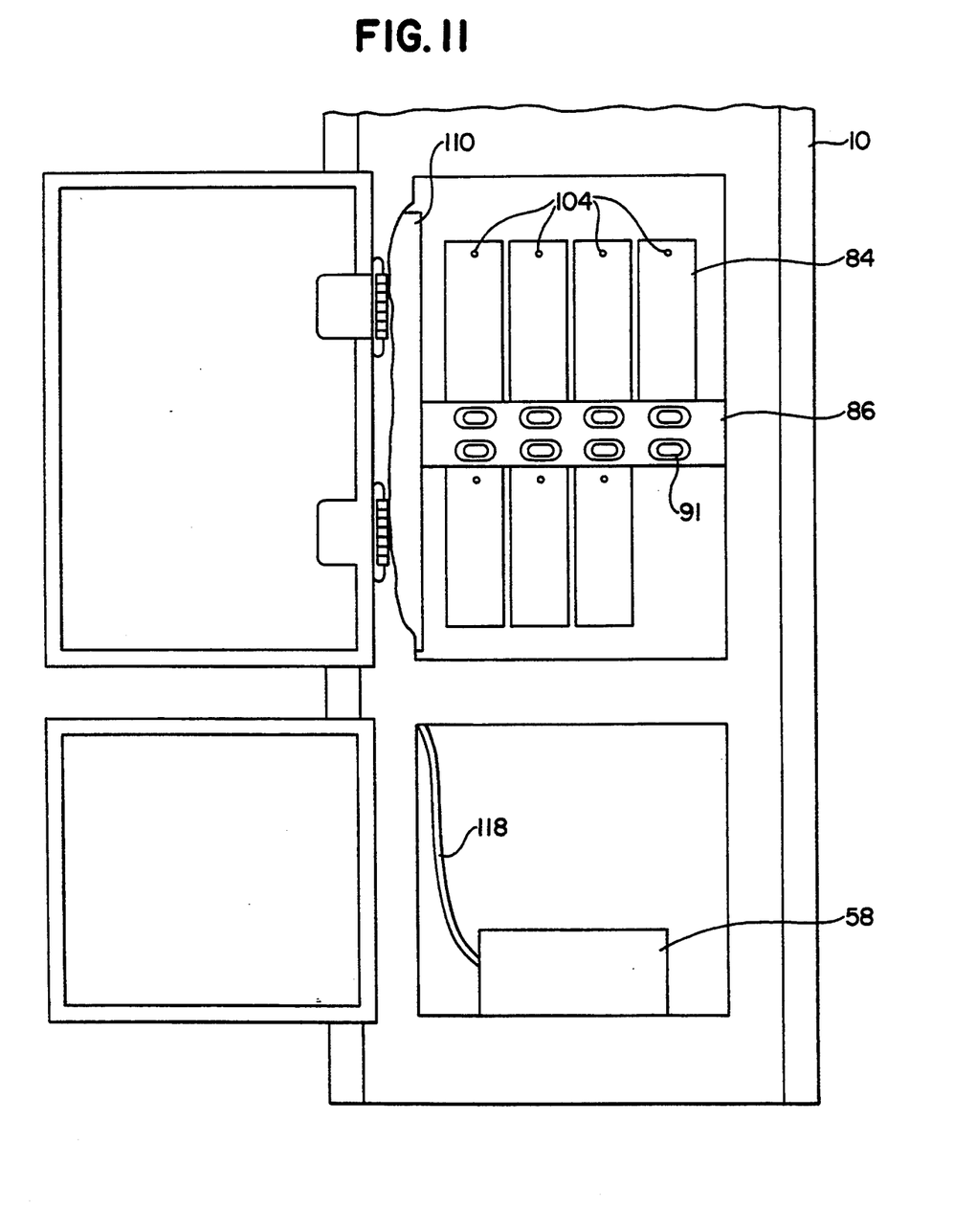
FIG. 11 is a partially cut away rear view of the listening and display unit including the multiple cassette unit of FIG. 9.

Referring again to FIG. 9, multi-pin connectors 94 of player support unit 80 are connected to a connector panel 110 via an integral signal and power cable 112. Connector panel 110 is attached with bolts to an inner wall of the listening and display unit 10 (See FIG. 11) to provide easy access to the connections of each component box mounted on the player support unit 80. Connector panel 110 is an aluminum corner plate and includes here, eight audio jacks 114 for connecting each component box 84 to a corresponding headphone jack 46 on the display unit. Connector panel 110 also includes a DC power jack 116 to provide distribution of DC power from the AC/DC power supply unit 58 to the player support unit 80 and individual boxes 84 via a power cable 118 (FIG. 11). This arrangement facilitates the replacement of faulty power supply and audio lines of the listening system.

Other embodiments, e.g., a listening and display unit which uses portable compact disc players or mini disc players, instead of cassette players are of course possible and are included in the following claims.

I claim:

1. A listening and display unit for playing and promoting audio recordings, said unit comprising:
   a display surface adapted for display thereon of a plurality of promotional and instructional messages;
   playing devices, each device playing a preselected audio recording;
   a player support unit disposed within the listening display unit to support said playing devices, said player support unit having a plurality of connectors, each connector corresponding to one of said playing devices;
   a plurality of audio jacks mounted on said display surface, each of said audio jacks associated with one of said connectors and playing devices;
   audio cables for connecting each of said audio jacks to an associated one of said playing devices;
   an AC/DC power unit adapted to power said plurality of playing devices, wherein said playing devices are configured to play the preselected audio recordings when said power unit is turned on; and
   wherein each of said playing devices is supported within an enclosure, said enclosure having a connector for coupling to an associated one of said plurality of connectors of said player support unit to provide power and audio signals to said playing devices.

2. The listening and display unit of claim 1 wherein each of said playing devices is supported within an enclosure, said enclosure having a connector for coupling to an associated one of said plurality of connectors of said player support unit to provide power and audio signals to said playing devices.

3. The listening and display unit of claim 1 wherein said player support unit includes a plurality of compartments for supporting each of said playing devices, a DC power jack connected to said AC/DC power unit via a power cable and a wiring harness for connecting said playing devices to said DC power jack.

4. The listening and display unit of claim 2 further comprising a connector plate attached to an inner wall of said listening and display unit and connected to said plurality of connectors of said player support unit via a signal cable, said connector plate including a DC power jack connected to said AC/DC power unit via a power cable and a plurality of audio jacks connected to said plurality of audio jacks mounted on said display unit.

5. The listening and display unit of claim 4 wherein said connectors of each enclosure mate with an associated one of said plurality of connectors of said player support unit.

6. The listening and display unit of claim 4 wherein said player support unit comprises a central support plate member for disposing a first plurality of said playing devices on a first surface and a second plurality on an opposing second surface and spring clamping means attached to said support plate member for securing each of said playing device enclosures within said player support unit.

7. The listening and display unit of claim 6 wherein said central support plate member includes a guide members for facilitating installation and removal of said playing device enclosures within and from said player support unit.

8. The listening and display unit of claim 7 wherein said guide members comprise metal pins extending through said central support plate member.

9. The listening and display unit of claim 6 wherein each playing device enclosure includes a light indicator to indicate that connectors of each enclosure are mated with an associated one of said plurality of connectors of said player support unit.

10. The listening and display unit of claim 9 wherein said light indicator is a light-emitting diode lamp.

11. The listening and display unit of claim 1 wherein a plurality of audio jacks is associated with each of said playing devices.

12. The listening and display unit of claim 1 further including a timer mechanism, wherein said power unit is connected to said timer mechanism.

13. The listening and display unit of claim 1 wherein said display surface is a free-standing tower, said surface having multiple surface segments.

14. The listening and display unit of claim 1 wherein said display surface is adapted for mounting on a wall.

15. The listening and display unit of claim 1 wherein said display surface defines at least one recessed area adapted for storage of audio recordings.

16. The listening and display unit of claim 1 wherein said playing devices comprise portable cassette players.

17. The listening and display unit of claim 16 wherein said cassette players comprise means for auto reverse of a cassette.

18. The listening and display unit of claim 1 wherein said playing devices comprise portable compact disc players.

19. The listening and display unit of claim 1 wherein said playing devices are configured to continuously play the preselected audio recordings by maintaining said playing devices in a play mode.

20. The listening and display unit of claim 1 wherein said player support unit is removable from said display unit.

* * * * *